(12) United States Patent
Uicker et al.

(10) Patent No.: US 9,394,002 B2
(45) Date of Patent: Jul. 19, 2016

(54) EXTRUDED METAL SUB-FRAME FOR A VEHICLE

(71) Applicant: FORD GLOBAL TECHNOLOGIES, LLC, Dearborn, MI (US)

(72) Inventors: John Joseph Uicker, Dearborn, MI (US); Sanjay Mehta, Plymouth, MI (US); Patrick Marchena, Berkley, MI (US); Xiaoming Chen, Canton, MI (US); David Anthony Wagner, Northville, MI (US); Michael M. Azzouz, Livonia, MI (US); Allen Li, Dearborn, MI (US); Gerald Heath, Allen Park, MI (US); Sunil K. Kasaragod, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 51 days.

(21) Appl. No.: 14/220,286

(22) Filed: Mar. 20, 2014

(65) Prior Publication Data

US 2015/0266511 A1    Sep. 24, 2015

(51) Int. Cl.
*B62D 21/11* (2006.01)
*B23K 20/12* (2006.01)
(Continued)

(52) U.S. Cl.
CPC .............. *B62D 21/11* (2013.01); *B23K 20/122* (2013.01); *B23K 20/129* (2013.01);
(Continued)

(58) Field of Classification Search
CPC .. B62D 21/11; B23K 20/2336; B23K 20/227; B23K 20/122; B23K 20/129; B23K 20/24; B23K 2203/10; B23K 2203/04; B23K 2201/24; B23K 2201/28; B23K 2201/006
See application file for complete search history.

(56) References Cited

U.S. PATENT DOCUMENTS

| 5,918,893 A | 7/1999 | Marquardt et al. |
| 6,398,262 B1 | 6/2002 | Ziech et al. |

(Continued)

FOREIGN PATENT DOCUMENTS

| EP | 1270374 A2 * | 1/2003 | ............. B62D 21/11 |
| EP | 1504983 A1 * | 2/2005 | ............... B62D 3/12 |

(Continued)

OTHER PUBLICATIONS

Magna Body & Chassis Systems, Cosma International, http://www.magnasteyr.com/capabilities/body-chassis-systems/products-services/chassis-sy.

(Continued)

*Primary Examiner* — Ruth Ilan
*Assistant Examiner* — Joselynn Y Sliteris
(74) *Attorney, Agent, or Firm* — Raymond L. Coppiellie; Brooks Kushman P.C.

(57) ABSTRACT

A sub-frame assembly for supporting a pair of wheels on a vehicle. The base may be an extrusion having a matrix of panels extending in a vertical direction. The sub-frame assembly has control arm brackets disposed on opposing ends of the base and attachment towers extending above the brackets providing attachment points to connect portions of an independent suspension to the vehicle and support a pair of wheels. The base, control brackets and attachment towers may be individual modular pieces. Left and right hand control brackets and attachment towers may be provided by respective unitary support pieces attached to opposing ends of the base. The unitary support pieces may be extrusions having panels extending in a transverse direction, nonaxial to the base. The base, control arm brackets and attachment towers, alternatively, may be provided by a single unitary extrusion having a matrix of panels extending in a transverse direction.

2 Claims, 3 Drawing Sheets

(51) Int. Cl.
  *B23K 20/24* (2006.01)
  *B23K 20/227* (2006.01)
  *B23K 20/233* (2006.01)

(52) U.S. Cl.
  CPC .......... *B23K 20/227* (2013.01); *B23K 20/2336* (2013.01); *B23K 20/24* (2013.01); *B23K 2201/006* (2013.01); *B23K 2201/24* (2013.01); *B23K 2201/28* (2013.01); *B23K 2203/04* (2013.01); *B23K 2203/10* (2013.01)

(56) References Cited

U.S. PATENT DOCUMENTS

| 6,470,990 | B1 | 10/2002 | Panoz |
| 7,654,543 | B2 | 2/2010 | Tanaka et al. |
| 7,938,414 | B2 * | 5/2011 | Buschjohann ......... B60G 3/202 280/124.109 |
| 8,201,414 | B2 | 6/2012 | Haehner et al. |
| 8,967,670 | B2 * | 3/2015 | Mohrlock .............. B60G 11/30 280/124.109 |

FOREIGN PATENT DOCUMENTS

| FR | 2986489 A1 * | 8/2013 | ............. B62D 21/11 |
| WO | 2011/119764 A1 | 9/2011 | |
| WO | WO 2014191655 A1 * | 12/2014 | ............. B62D 21/00 |

OTHER PUBLICATIONS 06-09 Chevrolet Impala 3.5L Engine Cradle Engine Crossmember #10486, Ebay website.

* cited by examiner

EXTRUDED METAL SUB-FRAME FOR A VEHICLE

TECHNICAL FIELD

This disclosure relates to sub-frames for connecting suspension components to a vehicle that support the vehicle on wheels connected to the suspension components, and specifically to the sub-frames having an extruded metal component.

BACKGROUND

A sub-frame is a structural component of a vehicle, such as an automobile or an aircraft that uses a separate structure within a larger body-on-frame or unit body to carry certain components, such as a suspension. The sub-frame is typically bolted or welded to the frame of the vehicle. When bolted, it is sometimes equipped with rubber bushings or springs to dampen vibration.

The principal purposes of using a sub-frame are to spread high chassis loads over a wide area, to isolate vibration and harshness from the rest of the vehicle, and to aid in manufacturing by allowing for a sub-assembly suspension unit to be attached to the vehicle on the assembly line. Sub-assembly suspension units may allow for an easier insertion of an engine, for example, through the bottom of the vehicle during manufacturing, as opposed to through a hood opening, or before a body is married to a frame.

As opposed to an automobile with a full frame and chassis, separate front and rear sub-frames have been used in some modern vehicles to aid in manufacturability and reduce overall cost.

There are generally three basic forms of the sub-frame; an axle type which usually carries the lower control arms and steering rack, a perimeter frame which usually carries the above components but in addition supports the engine, and a perimeter frame which carries the above components but in addition supports the engine, transmission and possibly full suspension, as is sometimes used on front wheel drive cars. A hybrid axle-perimeter type may carry the full suspension along with a steering rack and anti-sway bar.

A sub-frame is usually made of pressed steel panels that are much thicker than bodyshell panels, which are welded or fastened together. Sub-frames are sometimes made of light alloys (aluminum or magnesium) as either single unitary castings or fabricated from a collection of pressed and cast subcomponents. The use of hydroformed steel tubes has also been used.

SUMMARY

One aspect of this disclosure is directed to a sub-frame assembly for supporting a pair of wheels connected to a vehicle. In this aspect, an extruded metal base is disposable between the wheels. The extruded metal base is then also connectable to a frame of the vehicle. Control arm brackets are disposed on opposing ends of the base to provide lower attachment points to connect portions of an independent suspension to the vehicle. Attachment towers extend above the brackets to provide upper attachment points to connect the independent suspension to the vehicle. The control arm brackets, attachment towers, and base cooperate to connect portions of the independent suspension to the vehicle and support the wheels.

As mentioned above, the base is an extruded metal base. The base may have a matrix of extruded panels extending in a vertical direction. Alternatively, the base may have a matrix of panels extending in a transverse direction. The control arm brackets may be extruded metal brackets. Extruded metal control arm brackets may have a matrix of extruded panels extending in a transverse direction. The towers may be extruded metal towers. Extruded metal towers may have a matrix of extruded panels extending substantially in a longitudinal direction. Alternatively, extruded metal towers may have a matrix of extruded panels extending in a transverse direction.

A single bracket and a single tower may be provided in a unitary support piece. The unitary support piece may be an extruded metal unitary support piece. The extruded metal unitary support piece may have a matrix of extruded panels extending in a transverse direction. Two unitary support pieces may be connected to a base. In this configuration, the base may have a matrix of panels extending in a vertical direction or a transverse direction.

A single unitary support unit may include the base, the brackets and the towers. The unitary support unit may be an extruded metal unitary support unit. The extruded metal unitary support unit may have a matrix of extruded panels extending in a transverse direction.

This assembly may include lower control arms of the independent suspension connected to the lower attachment points. The assembly may include shocks of the independent suspension connected to the vehicle body or frame above or near the upper attachment points. The lower control arms and shocks may be configured to support the wheels and allow for independent articulation of the wheels relative the sub-frame.

The extruded metal base, extruded metal control arm brackets, and the extruded metal attachment towers may be extruded from light-metals or standard-metals. Examples of extruded light metals include extruded aluminum, extruded magnesium, and extruded metal alloys containing aluminum or magnesium. Examples of extruded standard-metals are extruded iron, extruded steel, and extruded iron and steel alloys.

According to another aspect of this disclosure, a vehicle having a frame with an extruded base connected to the frame is disclosed. The extruded base extends between a pair of wheels. Control arm brackets are disposed on respective ends of the base pivotally attaching control arms to the vehicle. Attachment towers extend from each control arm bracket attaching shocks to the vehicle. Control arms and shocks are connected to the brackets and towers to support the vehicle on the wheels.

The base may have a matrix of panels extending in either a vertical direction or a transverse direction. The control arm brackets may be extruded brackets having a matrix of panels extending in a transverse direction. The attachment towers may be extruded towers having a matrix of panels extending in either a substantially longitudinal direction or transverse direction.

One of the attachment towers and one of the control arm brackets may be provided by a unitary support piece. The unitary support piece is an extruded unitary support piece having a matrix of panels extending in a transverse direction. The base, control arm brackets and attachment towers may be provided by a single unitary support unit. The unitary support unit may be an extruded support unit having a matrix of panels extending in a transverse direction.

According to a further aspect of this disclosure, a method of manufacturing a light-metal sub-frame for a vehicle is disclosed. This method includes extruding a base, extruding a control arm bracket, and extruding an attachment tower. These steps may be completed in any order. Upon completion of the first three steps, the method includes assembling the base and the attachment tower to the control arm bracket such that extruded directions of the base, control arm bracket and attachment tower are nonaxial.

The method may also include assembling the base and the attachment tower to the control arm bracket by friction stir welding the base and the attachment tower to the control arm.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
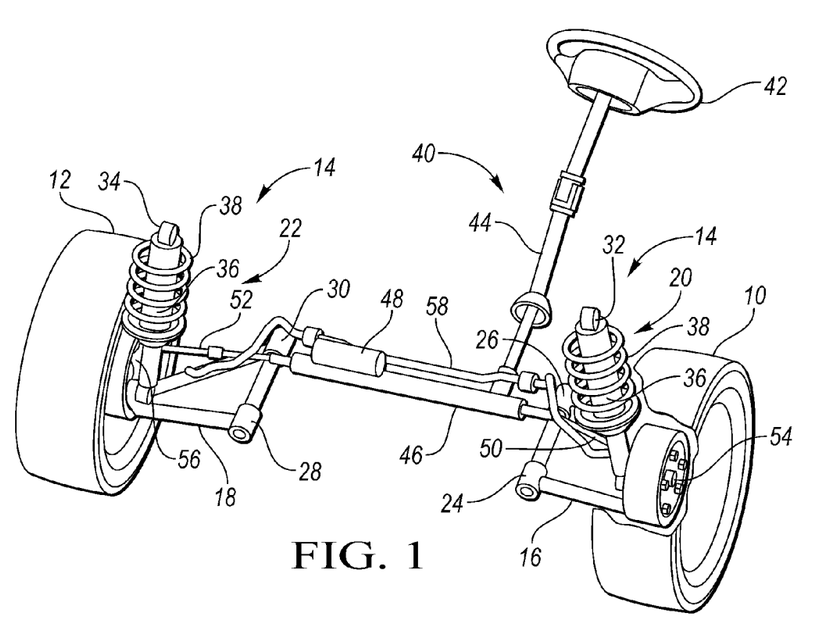
FIG. 1 is a diagrammatic view of a pair of wheels supported by independent suspension components.

FIG. 1 shows a left wheel 10 and a right wheel 12 supported by independent suspension components 14. Independent suspension components 14 may include a left lower control arm 16, a right lower control arm 18, a left shock 20, and a right shock 22, among others. The left lower control arm 16 may include forward and rearward attachment locations 24, 26. The right lower control arm 18 may include forward and rearward attachment locations 28, 30. The left shock 20 may include a left upper attachment location 32, and the right shock 22 may include a right upper attachment location 34. The shocks 20, 22 may include a Macpherson strut 36 and coil spring 38. Although forward, rearward, lower and upper designations are used in the description, it should be understood that orientations of the control arms, shocks and attachment locations may be rearranged.

Left and right wheels 10, 12 are shown as steerable wheels, however the wheels 10, 12 may be any set of wheels 10, 12 that share a common axle. The term axle, as used here, does not necessarily mean that both wheels 10, 12 are attached to a common shaft or carrier, rather it indicates that the pair of wheels 10, 12 are disposed transversely across the vehicle from each other. A steering system 40 is shown in the figure with a steering wheel 42, steering shaft 44, a steering rack 46, a steering assist motor 48, and left and right tie-rods 50, 52. Each wheel 10, 12 may rotate on a hub and bearing assembly 54 with the hub and bearing being attached to a knuckle 56. The lower control arms 16, 18, shocks 20, 22, and tie-rods 50, 52 may also be attached to the knuckle 56. The lower control arms 16, 18 and shocks 20, 22 cooperate to support the wheels 10, 12 and allow for independent articulation of the wheels 10, 12 relative a vehicle (not shown). An anti-sway bar 58 may also be included.

Figure 2:
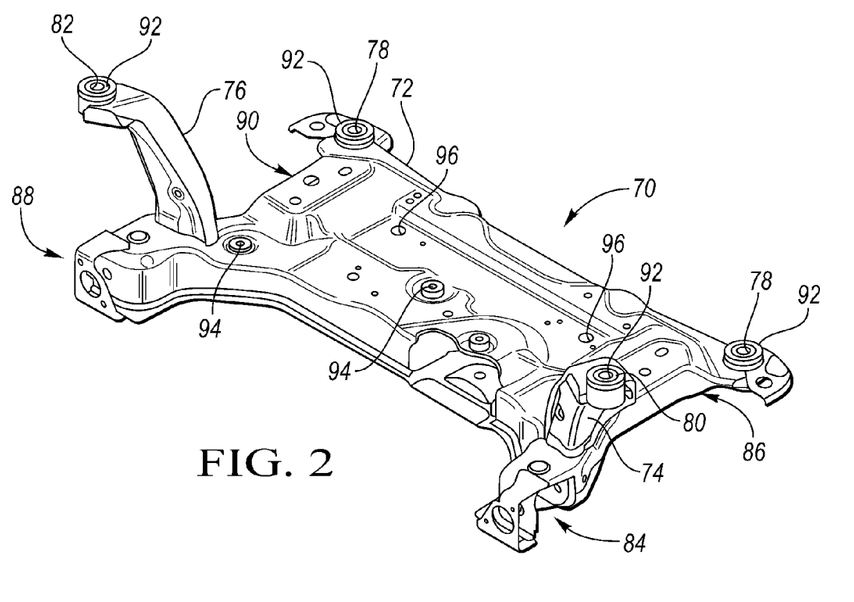
FIG. 2 is a front perspective view of a sub-frame having stamped steel components.

FIG. 2 shows a sub-frame 70 having stamped steel components. A stamped steel base 72 and left and right stamped steel towers 74, 76 extending upwardly from the base 72 make up a majority of the sub-frame 70. The base 72 may define rearward vehicle attachment locations 78. The rearward vehicle attachment locations 78 may be attached to a vehicle frame or body (not shown). The towers 74, 76 may define forward vehicle attachment locations 80, 82. The forward vehicle attachment locations 80, 82 may be attached to a vehicle frame or body (not shown). The base 72 may define left forward and rearward lower control arm attachment locations 84, 86 and right forward and rearward lower control arm attachment locations 88, 90.

The left forward attachment location 24 of the left lower control arm 16 (see FIG. 1) may be connected to the stamped steel sub-frame 70 at the left forward lower control arm attachment location 84. The left rearward attachment location 26 of the left lower control arm 16 (see FIG. 1) may be connected to the stamped steel sub-frame 70 at the left rearward lower control arm attachment location 86. Similarly, the right forward and rearward attachment locations 28, 30 of the right lower control arm 18 (see FIG. 1) may be connected to the stamped steel sub-frame 70 at the right forward and rearward lower control arm attachment locations 88, 90, respectively.

The left upper attachment location 32 of the left shock 20 (see FIG. 1) are typically not connected to the steel sub-frame 70, rather they extend above the forward attachment location 80 and connect with a frame or body component of the vehicle (not shown), however the tower 74 does provide structural support for the assembly. Similarly, the right upper attachment location 34 of the right shock 22 (see FIG. 1) may be connected to the vehicle above or near the steel sub-frame 70 at the forward attachment location 82. Thus the sub-frame 70 is disposed between the vehicle (not shown) and the independent suspension components 14, providing attachment locations 78, 80, 82, 84, 86, 88, 90 for the independent suspension components 14 and the sub-frame 70 to the vehicle. Sub-frame 70 may also include bushings 92 disposed between the sub-frame 70 and the vehicle at vehicle attachment locations 78, 80, 82 to reduce vibration transfer from the sub-frame 70 to the vehicle.

Sub-frame 70 may also define a number of steering system attachment locations 94, and anti-sway bar attachment locations 96. Steering system 40 components such as the steering rack 46 or steering assist motor 48 (see FIG. 1) may be attached to the sub-frame 70 at the steering system attachment locations 94. The anti-sway bar 58 (see FIG. 1) may be attached to the sub-frame 70 at the anti-sway bar attachment locations 96.

Figure 3:
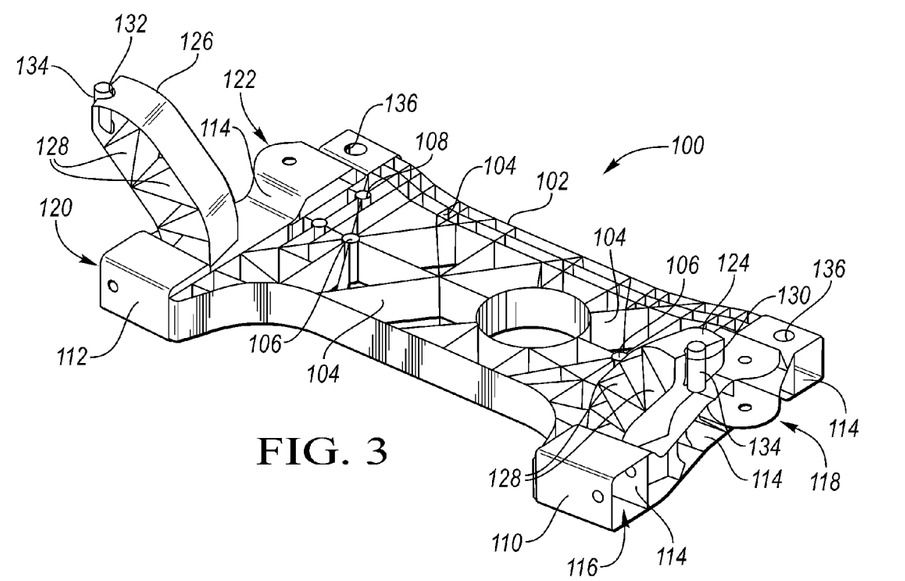
FIG. 3 is a front perspective view of a modular sub-frame having an extruded base, extruded control arm brackets, and extruded attachment towers with extruded directions of the base, control arm brackets and attachment towers being nonaxial.

FIG. 3 shows a modular sub-frame assembly 100 having an extruded base 102.

Sub-frame assembly 100, like sub-frame assembly 70 (see FIG. 2), is configured to connect to a vehicle (not shown) and aid in the support of a pair of wheels 10, 12 (see FIG. 1). Extruded base 102 is disposable between the wheels 10, 12. Extruded base 102 may extend transversely across the vehicle between the wheels 10, 12. The base 102 comprises a matrix of panels 104 extending in a vertical direction. The extruded base 102 is a singular direction or unidirectional extruded base 102. The extruded base 102 may be extruded from light-metals or standard-metals. Examples of extruded light-metals include extruded aluminum, extruded magnesium, or extruded metal alloys containing a higher percentage of aluminum or magnesium than the other alloying metals. Examples of standard-metals are extruded iron, extruded steel, and extruded iron and steel alloys.

The extruded base 102 is a central element of the sub-frame assembly 100. The extruded base 102 may be generally rectangular having an outer perimeter defined by its most outward edges. Generally rectangular, as used here, does not mean perfectly rectangular, it merely means that one axial direction of the extruded base 102 is longer than another axial direction of the extruded base, and that the extruded base 102 is generally symmetrical to provide an appearance of a rectangular shape. The outer perimeter of the extruded base 102 does not have to have straight sides nor must the sides be uninterrupted, as shown by a curved front edge in FIG. 3. A diagonal measurement of the generally rectangular extruded base 102 is greater than 450 mm. A longitudinal measurement of the extruded base 102 is greater than 200 mm. A transverse measurement of the extruded base 102 is greater than 400 mm. A vertical height of the extruded base 102 may be greater than or equal to 20 mm. The inner portion of the extruded base 102, the portion of the base 102 within the outer perimeter, is composed of extruded panels 104 wherein the extruded panels may define a number of larger openings for vehicle components to be attached to the base 102, or to allow clearance holes to support vehicle components or simply allow them to pass through the base 102.

The extruded base 102 may define a number of steering system attachment points 106, and anti-sway bar attachment locations 108. Steering system 40 components such as the steering rack 46 or steering assist motor 48 (see FIG. 1) may be attached to the sub-frame assembly 100 at the steering system attachment points 106. The anti-sway bar 58 (see FIG. 1) may be attached to the sub-frame assembly 100 at the anti-sway bar attachment points 108. The steering system and anti-sway bar attachment points 106, 108 may be holes defined by panels 104 extending in the vertical direction.

Connected to and extending from the extruded base 102 on opposing transverse ends are left and right control arm brackets 110, 112. The control arm brackets 110, 112 may be extruded metal control arm brackets 110, 112. Extruded control arm brackets 110, 112 may have a matrix of extruded panels 114 extending in a transverse direction. The control arm brackets 110, 112 provide left and right forward and rearward lower attachment points 116, 118, 120, 122, respectively. Left and right forward and rearward lower attachment points 116, 118, 120, 122 may be used to connect portions of the independent suspension 14 to the vehicle and support the wheels 10, 12. Specifically, the left forward and rearward attachment locations 24, 26 of the left lower control arm 16 (see FIG. 1) may be connected to the sub-frame assembly 100 at the left forward and rearward lower control arm attachment points 116, 118, respectively. The right forward and rearward attachment locations 28, 30 of the right lower control arm 18 (see FIG. 1) may be connected to the sub-frame assembly 100 at the right forward and rearward lower control arm attachment points 120, 122, respectively.

Connected to and extending from the control arm brackets 110, 112 are attachment towers 124, 126. Like the extruded base 102, the attachment towers may also be extruded attachment towers 124, 126. The towers 124, 126 may have a matrix of extruded panels 128 extending substantially in a longitudinal direction. Substantially longitudinal, as used here, means that the extruded panels 128 extend more in the longitudinal direction than in the transverse or vertical directions. The attachment towers 124, 126 provide upper attachment points 130, 132. The attachment points 130, 132 may connect to the body structure of the vehicle. The attachment points 130, 132 may be used to connect portions of the independent suspension 14 to the vehicle and ultimately support the wheels 10, 12. The left and right upper attachment locations 32, 34 of the shocks 20, 22 (see FIG. 1) may be connected to the vehicle structure above or near the upper attachment points 130, 132, but not to the upper attachment points 130, 132. The body structure, whether as a single component or multiple body components or frame components, provide the additional structure to support the shocks 20, 22 in combination with the sub-frame 100 assembly. The sub-frame assembly 100 may also use a sleeve 134 welded to the tower 124, 126 where the top of the sleeve 134 connects to the vehicle.

The sub-frame assembly 100 is connectable to a frame of the vehicle (not shown) at rearward vehicle attachment points 136. Rearward vehicle attachment points 136 are shown in control arm brackets 110, 112, however they may be provided by the extruded base 102 as well. The sub-frame assembly 100 may cantilever from the rearward vehicle attachment points 136, may connect to the vehicle at or around the attachment towers 124, 126, or may include a modular lower load path components (not shown) that may attach to and extend from a front portion the sub-frame assembly 100. The modular lower load path components may attach to the sub-frame assembly 100 at or near left and right forward attachment points 116, 120.

The extruded control arm brackets 110, 112 and extruded attachment towers 124, 126, like the extruded base 102, may be extruded from light-metals or standard-metals. The control arm brackets 110, 112 and attachment towers 124, 126, however, need not be extruded components in sub-frame 100 and may be provided by stampings and other configurations. The extruded base 102, control arm brackets 110, 112 and attachment towers 124, 126 are modular components that may be joined by welding or by other know fastening means.

A modular sub-frame assembly 100 with extruded base 102 configurable to accept unique modular design details required for different sub-frame applications allows for adaptations to optimize the sub-frame design for different vehicles' requirements, including unique attachment point geometry. For example two vehicles with equal track width but unequal ride height may use the same extruded base 102 and control arm brackets 110, 112, while changing out different attachment towers 124, 126 to accommodate for a larger suspension components 14. Two vehicles with similar ride height but unequal track width may use the same control arm brackets 110, 112 and attachment towers 124, 126, but may use differing width extruded bases 102.

The extruded base 102 may require a fairly large extrusion. If unable to obtain such a large extrusion as a single piece, the base 102 may also be created by making left and right sections (not shown) as separate extrusions and joining them together. Friction stir welding could provide a suitable means to join the parts. If the left and right sections are symmetrical they can be obtained from a single extrusion tool. The base 102 may also be designed to accept certain added features which allow the design to be adapted for different vehicle configurations.

As mentioned above, modular lower control arm brackets 110, 112 may provide extruded panels 114 extending in a transverse direction. Extruded panels 114 may provide for attachment features which are not aligned with the direction of extrusion of the base 102. The nonaxial extrusion directions avoid the need for additional material and machining in a vertical extruded base. Use of a separate extrusion also allows the components to be joined in unique locations to the base 102 for different vehicle applications, potentially supporting different suspension geometry.

Modular attachment towers 124, 126 may be attached to the base 102 or to the control arm brackets 110, 112. Attachment towers 124, 126 may be changed to support differences in ride height between different vehicle applications. The modular attachment towers 124, 126 may also provide for nonaxial aligned extrusion panels 128. The nonaxial extrusion directions may avoid the need for additional material and machining in a vertical extruded base 102 or a transversely extruded control arm bracket 110, 112.

Figure 4:
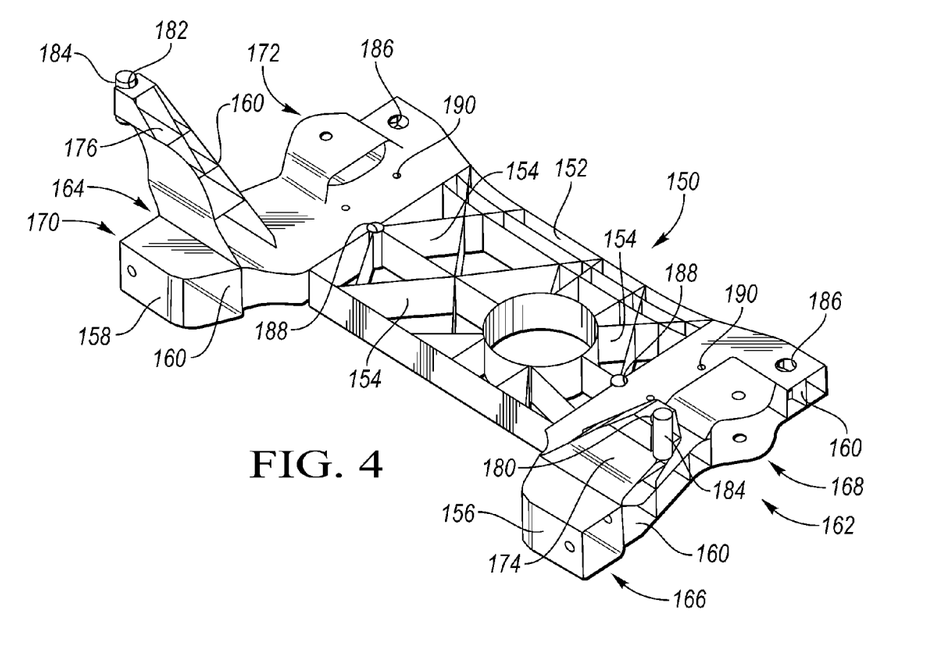
FIG. 4 is a front perspective view of a modular sub-frame having an extruded base disposed between two unitary support pieces providing control arm brackets and attachment towers.

FIG. 4 shows a semi-modular sub-frame assembly 150 having an extruded base 152. Sub-frame assembly 150, like sub-frame assembly 100 (see FIG. 3), is configured to connect to a vehicle (not shown) and support a pair of wheels 10, 12 (see FIG. 1). Extruded base 152 is disposable between the wheels 10, 12. Extruded base 152 may extend transversely across the vehicle between the wheels 10, 12. The base 152 comprises a matrix of panels 154 extending in a vertical direction. The extruded base 152 is a singular direction or unidirectional extruded base 152. The extruded base 152 may be extruded from light-metals or standard-metals.

The extruded base 152 is a central element of the sub-frame assembly 150. The extruded base 152, like extruded base 102, may be generally rectangular having an outer perimeter defined by its most outward edges. Generally rectangular, as used here, does not mean perfectly rectangular, it merely means that one axial direction of the extruded base 152 is longer than another axial direction of the extruded base 152, and that the extruded base 152 is generally symmetrical to provide an appearance of a rectangular shape. The outer perimeter of the extruded base 152 does not have to have straight sides nor must the sides be uninterrupted. A diagonal measurement of the generally rectangular extruded base 152 is greater than 450 mm. A longitudinal measurement of the extruded base 152 is greater than 200 mm. A transverse measurement of the extruded base 152 is greater than 400 mm. A vertical height of the extruded base 152 may be greater than or equal to 20 mm. The inner portion of the extruded base 152, the portion of the base 152 within the outer perimeter, is composed of extruded panels 154 wherein the extruded panels may define a number of larger openings for vehicle components to be attached to the base 152, or to allow clearance holes to support vehicle components or simply allow them to pass through the base 152.

Connected to and extending from the extruded base 102 on opposing transverse ends are left and right unitary support pieces 156, 158. The unitary support pieces 156, 158 may be extruded metal unitary support pieces 156, 158. Extruded unitary support pieces 156, 158 may have a matrix of extruded panels 160 extending in a transverse direction. The unitary support pieces 156, 158 may include control arm brackets 162, 164. The unitary support pieces 156, 158 provide left and right forward and rearward lower attachment points 166, 168, 170, 172, respectively. Left and right forward and rearward lower attachment points 166, 168, 170, 172 may be used to connect portions of the independent suspension 14 to the vehicle and support the wheels 10, 12. Specifically, the left forward and rearward attachment locations 24, 26 of the left lower control arm 16 (see FIG. 1) may be connected to the sub-frame assembly 150 at the left forward and rearward lower control arm attachment points 166, 168, respectively. The right forward and rearward attachment locations 28, 30 of the right lower control arm 18 (see FIG. 1) may be connected to the sub-frame assembly 150 at the right forward and rearward lower control arm attachment points 170, 172, respectively.

The unitary support pieces 156, 158 may also include attachment towers 174, 176. The towers 174, 176 share in the matrix of extruded panels 160 extending in a transverse direction. The attachment towers 174, 176 provide upper attachment points 180, 182. The attachment points 180, 182 may be used to connect the sub-frame assembly 150 to the vehicle and cooperate with the vehicle to support the wheels 10, 12. The left and right upper attachment locations 32, 34 of the shocks 20, 22 (see FIG. 1) may be connected to the vehicle above the sub-frame assembly 150 at the upper attachment points 180, 182. Although the upper attachment points 180, 182 do not connect to the shocks 20, 22 directly, in cooperation with the vehicle they provide enhanced structural rigidity for the assembly. The sub-frame assembly 150 may also use a sleeve 184 welded to the tower 174, 176 where the top of the sleeve 184 connects to the vehicle.

The extruded base 152 or the unitary support pieces 156, 158, or a combination of the two, define a number of steering system attachment points 188 and anti-sway bar attachment points 190. Steering system 40 components such as the steering rack 46 or steering assist motor 48 (see FIG. 1) may be attached to the sub-frame assembly 150 at the steering system attachment points 188. The anti-sway bar 58 (see FIG. 1) may be attached to the sub-frame assembly 150 at the anti-sway bar attachment points 190. The steering system and anti-sway bar attachment points 188, 190 may be holes defined by panels 154 extending in the vertical direction, or may be holes drilled in panels 160 extending in the transverse direction.

The extruded unitary support pieces 156, 158, like the extruded base 152, may be extruded from light-metals or standard-metals. The semi-modular sub-frame assembly 150, with extruded base 152 configurable to accept unique modular design details required for different sub-frame applications, allows for adaptations to optimize the sub-frame design for different vehicles' requirements, including unique attachment point geometry. For example two vehicles with equal track width may use the same extruded base 152 while changing out different unitary support pieces 156, 158 to accommodate for a larger suspension components 14. Two different vehicles with similar ride height and suspension components 14 may use the same extruded base 152 while changing out different unitary support pieces 156, 158 to accommodate for a differing track width. Alternatively, differing track width vehicles may use the same unitary support pieces 156, 158 and differing width extruded bases 102.

As mentioned above, modular unitary support pieces 156, 158 may provide extruded panels 160 extending in a transverse direction. Extruded panels 160 may provide for attachment features which are not aligned with the direction of extrusion of the base 152. The nonaxial extrusion directions avoid the need for additional material and machining in a vertical extruded base 152. Use of a separate extrusion also allows the part to be joined in unique locations to the base 152 for different vehicle applications, potentially supporting different suspension geometry. The sub-frame assembly 150 is connectable to a frame of the vehicle (not shown) at rearward vehicle attachment points 186. The sub-frame assembly 150 attaches shocks 20, 22 and control arms 16, 18 to the vehicle to support the vehicle on the wheels 10, 12.

Figure 5:
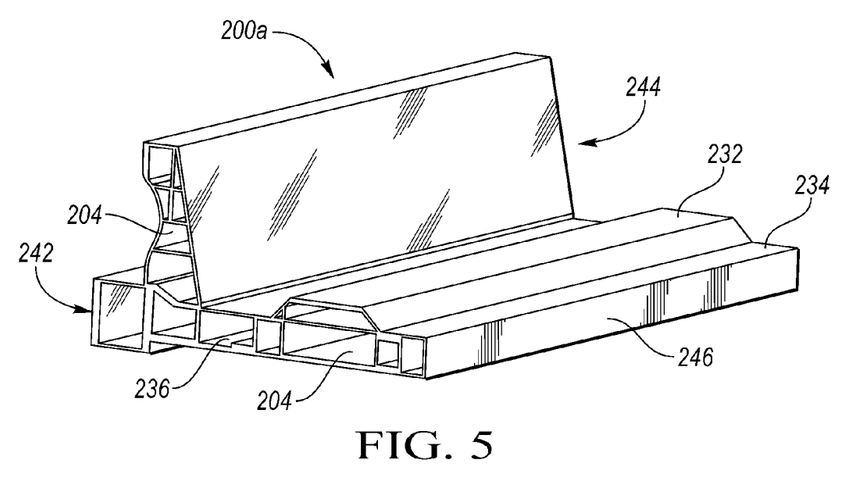
FIG. 5 is a rear perspective view of a pre-machined sub-frame provided as a single extruded unitary support unit.
Figure 6:
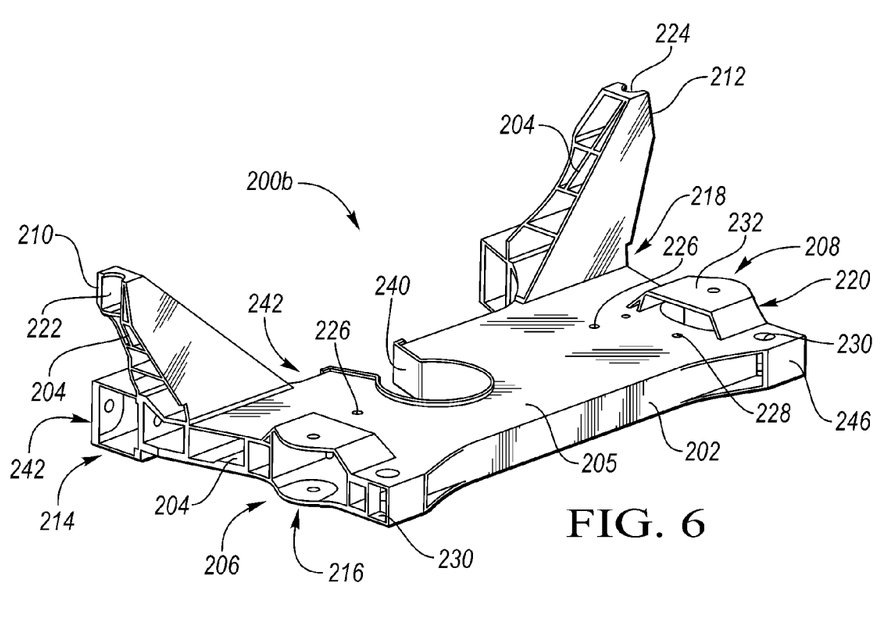
FIG. 6 is a rear perspective view of a post-machined sub-frame provided as a single extruded unitary support unit.

FIGS. 5 and 6 show a pre-machined and post-machined sub-frame 200a, 200b. The sub-frame 200a, 200b is a single extruded unitary support unit 202 having a matrix of panels 204 extending in a transverse direction. The single extruded unitary support unit 202, like sub-frame assembly 150 (see FIG. 4), is configured to connect to a vehicle (not shown) and support a pair of wheels 10, 12 (see FIG. 1). The single extruded unitary support unit 202 is disposable between the wheels 10, 12. The single extruded unitary support unit 202 may be extruded from light-metals or standard-metals.

The pre-machined sub-frame 200a may be machined into the single extruded unitary support unit 202 to include a base section 205, control arm brackets 206, 208, and the attachment towers 210, 212. The extruded base section 205 is a singular direction or unidirectional extruded base section 205. The control arm brackets 206, 208 may be machined to provide left and right forward and rearward lower attachment points 214, 216, 218, 220, respectively. Similar to above configurations, left and right forward and rearward lower attachment points 214, 216, 218, 220 may be used to connect portions of the independent suspension 14 to the vehicle and support the wheels 10, 12.

The base section 205 is a central element of the single unitary support unit 202. The base section 205, like extruded bases 102 and 152, may be generally rectangular having a perimeter defined by its most outward longitudinal edges and a transverse transitional area from the base section 205 to the control arm brackets 206, 208. Generally rectangular, as used here, does not mean perfectly rectangular, it merely means that one axial direction of the base section 205 is longer than another axial direction of the base section 205, and that the base section 205 is generally symmetrical to provide an appearance of a rectangular shape. The perimeter of the base section 205 does not have to have straight sides nor must the sides be uninterrupted, as shown by a cut-out in the front edge in FIG. 6. A diagonal measurement of the generally rectangular base section 205 is greater than 450 mm. A longitudinal measurement of the base section 205 is greater than 200 mm. A transverse measurement of the base section 205 is greater than 400 mm. A vertical height of the base section 205 may be greater than or equal to 20 mm. The inner portion of the base section 205, the portion of the base section 205 within the perimeter as defined above, is composed of transversely extending extruded panels 204 wherein the extruded panels may be cut out to define a number of larger openings for vehicle components to be attached to the base section 205, or to allow clearance holes to support vehicle components or simply allow them to pass through the base section 205.

The attachment towers 210, 212 may be machined to provide upper attachment points 222, 224. The attachment points 222, 224 may connect to the vehicle body or frame and in combination with the vehicle body or frame be used to connect portions of the independent suspension 14 to the vehicle and support the wheels 10, 12, similarly to the other embodiments as described above.

The single extruded unitary support unit 202 may define a number of steering system attachment points 226, and an anti-sway bar attachment point 228. Steering system 40 components (see FIG. 1) may be attached to the single extruded unitary support unit 202 at the steering system attachment points 226. The anti-sway bar 58 (see FIG. 1) may be attached to single extruded unitary support unit 202 at the anti-sway bar attachment point 22. The single extruded unitary support unit 202 is connectable to a frame of the vehicle (not shown) at rearward vehicle attachment points 230. The single extruded unitary support unit 202 may also be connected to the vehicle at the attachment points 222, 224, or at or near the front of the unit 202.

The single extruded unitary support unit 202 may be extruded in light-metals such as aluminum or magnesium. The extrusion will directly create surfaces for body attachments and pockets for control arm assemblies. Some post operation machining needs to be done to trim the sub-frame 200a to the desired profile and cut openings on the top surface to accommodate assemblies of required chassis/suspension components.

One such method includes extruding a pre-machined sub-frame 200a in a transverse direction. The operation creates panel surfaces 204 for sub-frame to vehicle connection and pockets for control arm attachment. An extra extrusion cell 232 may be designed along the rearward control arm pockets and on top of the main structure 234 of the sub-frame 200a. This will allow for it to be combined with the lower cells 236 in the machining process to create a bigger pocket that may be required for rearward control arm attachments 26, 30. The panels 204 generating the pockets for the front and rear control arms may be designed and extruded based on given package space and clearance criteria. The panels 204 inside the front towers 210, 212 for body connection are designed and built to reinforce the tower to meet stiffness targets.

The other panels 204 in the transverse extrusion are designed and extruded at the locations where openings may be cut on the top and bottom surfaces to create mounting points for steering system components, an anti-sway bar, and a roll restrictor 240. An increased matrix of panels 204 will improve the stiffness of the sub-frame in the area of increase.

The front surface 242 of the extrusion 200a is trimmed to the desired shape based on package space. The raising portion 244 of the extrusion is trimmed to create the towers 210, 212 for vehicle body connection and shock support. The rear surface 246 of the extrusion is trimmed to the desired shape based on package space. A portion of the extra cell 232 is trimmed to finish the top surface.

A method of forming a modular assembly allows for separate extrusions to be made for each component. Such a method includes extruding a base, extruding a control arm bracket, and extruding an attachment tower. These components may be extruded in any order. Next, the method includes assembling the base and the attachment tower to the control arm bracket such that extruded directions of the base, control arm bracket and attachment tower are nonaxial.

The step of assembling the base and the attachment tower to the control arm bracket may include friction stir welding the base and the attachment tower to the control arm bracket. Each component may require additional machining to cut the component to shape. Each component may need additional machining to provide holes for some of the attachment points. Each component may have additional parts added to them, such as sleeves, bushings, washers, among others. The machining and or assembly of additional componentry to each component may be done on the individual components before assembly or after assembly as the case may be. This method of manufacturing a light metal sub-frame for a vehicle would produce a sub-frame assembly similar to the one shown in FIG. 3.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A method of manufacturing a light-metal sub-frame for a vehicle comprising:
    extruding a base;
    extruding a control arm bracket;

extruding an attachment tower; and assembling the base and the attachment tower to the control arm bracket such that extruded directions of the base, control arm bracket and attachment tower are nonaxial.

2. A method of manufacturing a light-metal sub-frame for a vehicle comprising:

extruding a base;

extruding a control arm bracket;

extruding an attachment tower; and assembling the base and the attachment tower to the control arm bracket by friction stir welding the base and the attachment tower to the control arm bracket such that extruded directions of the base, control arm bracket and attachment tower are nonaxial.

* * * * *